(12) United States Patent
Oda (10) Patent No.: US 6,490,464 B1
(45) Date of Patent: Dec. 3, 2002

(54) SMART CARD WITH MULTI-CHARACTER MEMORY FOR VARIOUS TELEPHONE DEVICES

(75) Inventor: Tateru Oda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/463,455

(22) PCT Filed: Jun. 3, 1998

(86) PCT No.: PCT/JP98/02461

§ 371 (c)(1),
(2), (4) Date: Jan. 27, 2000

(87) PCT Pub. No.: WO99/63732

PCT Pub. Date: Dec. 9, 1999

(51) Int. Cl.[7] ............................. H04B 1/38; H04M 1/00
(52) U.S. Cl. ..................... 455/558; 455/186.2; 455/557
(58) Field of Search ................................ 455/556, 557, 455/558, 186.1, 186.2, 566, 550, 422; 235/380; 345/171, 172, 168, 169, 703

(56) References Cited

U.S. PATENT DOCUMENTS

| 5,932,119 | A | * | 8/1999 | Kaplan et al. | ......... 219/121.68 |
| 5,953,541 | A | * | 9/1999 | King et al. | .................. 710/67 |
| 6,004,049 | A | * | 12/1999 | Knox | ........................ 400/89 |
| 6,167,287 | A | * | 12/2000 | Chozui | ..................... 455/557 |
| 6,223,059 | B1 | * | 4/2001 | Haestrup | .................... 455/566 |
| 6,275,690 | B1 | * | 8/2001 | Higuchi et al. | ............. 455/412 |
| 6,307,541 | B1 | * | 10/2001 | Ho et al. | .................... 345/171 |

FOREIGN PATENT DOCUMENTS

JP        6507037        8/1994

* cited by examiner

*Primary Examiner*—Nguyen T. Vo
*Assistant Examiner*—Eliseo Ramos-Feliciano
(74) *Attorney, Agent, or Firm*—Rothwell, Figg, Ernst & Manbeck (57) ABSTRACT

When operational information from a key pad 13 is received from the transmission section 18 of a mobile telephone 11, the microprocessor 17 of a smart card 12 specifies a character or a character string corresponding to operational information of the key pad 13.

18 Claims, 6 Drawing Sheets

FIG.1

PRIOR ART

SMART CARD WITH MULTI-CHARACTER MEMORY FOR VARIOUS TELEPHONE DEVICES

FIELD OF THE INVENTION

The present invention relates to a communication device which facilitates the input of characters, for example, when recording a telephone number in a communication terminal (mobile information terminal, a fixed line telephone or a mobile telephone).

BACKGROUND TO THE INVENTION

Figure 1:
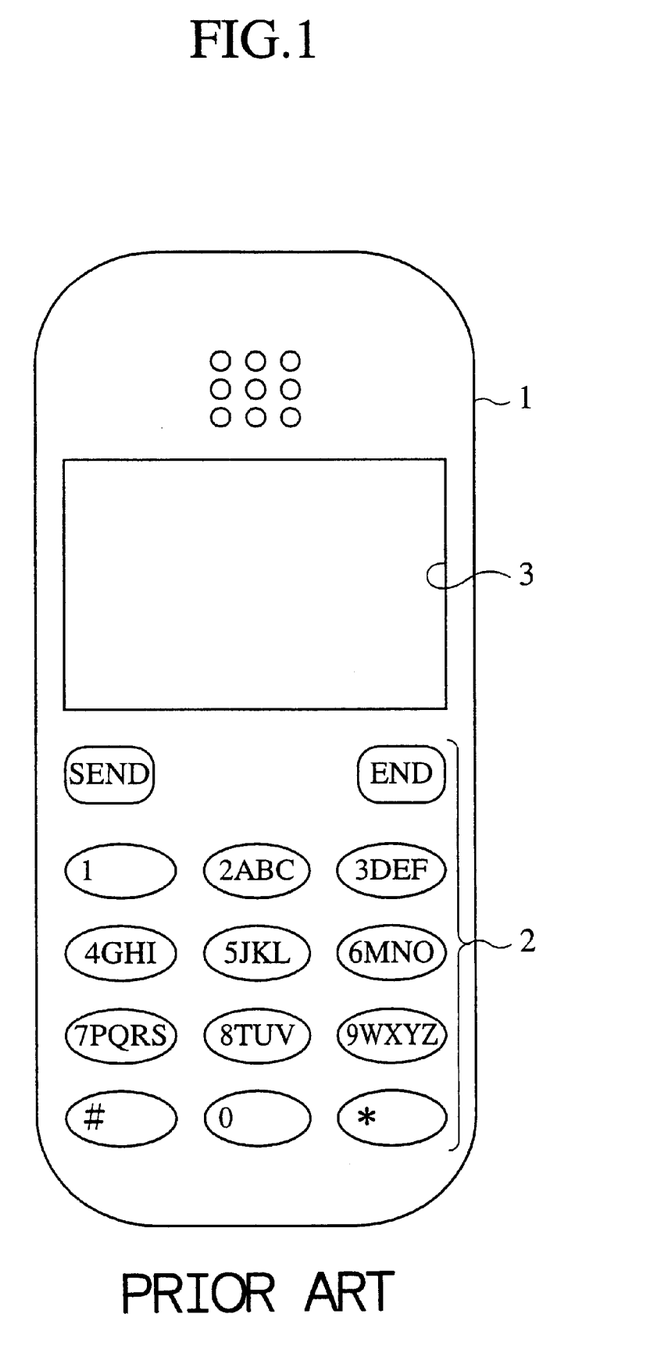
FIG. 1 shows a conventional communication device.

FIG. 1 shows a conventional communication device. In the figure, reference numeral 1 denotes a mobile telephone which is the communication terminal of a communication device, 2 is an operation key which inputs characters or telephone numbers, 3 is a display which displays operational information of the operation key.

The operational of the invention will be described below.

First, when a telephone call is made using a mobile telephone 1, the operation of pushing in sequence those operation keys 2 that correspond to the desired telephone number is performed. However when the telephone number of a specified person is recorded in the mobile telephone 1, for example, in addition to inputting telephone numbers, it is necessary to input the characters of the name or of the specified person.

Although the types of characters which can be input differ, depending on the type of mobile telephone, generally it is possible to input Roman script, and the Japanese syllabary scripts of hiragana and katakana. (Some types of device allow the input of Chinese characters).

However as only somewhat more than ten operation keys 2 are provided on the mobile telephone 1 (in the example shown in FIG. 1, 12 keys are provided), each alphabet character is not assigned to keys 2 independently.

Thus generally a complicated method of inputting characters is involved.

Two general types of character input will now be described.

1. First Operational Method

For example, when inputting Roman script characters via operation keys 2, numeral keys on which corresponding alphabet characters are labeled are pushed the number of times corresponding to their labeled position.

Specifically, in order to input the letter "A", the numeral key "2" is pushed once.

In order to input the letter "B", the numeral key "2" is pushed twice.

In order to input the letter "C", the numeral key "2" is pushed three times.

In order to input the letter "K", the numeral key "5" is pushed twice.

2. Second Operational Method

For example, when inputting Roman script characters via operation keys 2, numeral keys on which corresponding alphabet characters are labeled are firstly pushed, and then the letter is input by depressing the numeral key corresponding to the letter's labeled position.

Specifically, in order to input the letter "A", the numeral; key "2" is pushed and then the numeral key "1" is depressed.

In order to input the letter "B", the numeral key "2" is pushed and then the numeral key "2" is depressed.

In order to input the letter "C", the numeral key "2" is pushed and then the numeral key "3" is depressed.

In order to input the letter "K", the numeral key "5" is pushed and then the numeral key "2" is depressed.

The method of inputting Chinese characters will not be specifically described however it is noted that it is considerably more complicated than the method of inputting Roman characters.

Since a conventional communication device is constructed as above, although the operation keys 2 can be operated according to the operational method determined for a mobile telephone to input desired characters, the method of inputting characters is complicated. Furthermore the method of inputting characters changes with the type of mobile telephone. Therefore, for example, if a user purchases a new mobile telephone 1, it will be necessary for the user to master a new method of inputting characters for the new mobile telephone 1 when recording telephones numbers and the like. Thus the problem has arisen that user-friendly characteristics with respect to character input have not been developed.

The present invention is proposed to solve the above problem and has as its object the provision of a communication device which can input characters according to a common operational method even when the type of mobile telephone differs.

DISCLOSURE OF THE INVENTION

The communication device of the present invention is provided with a smart card which specifies a character or a string of characters which correspond to operational information on receipt of operational information from a transmission means of a communication terminal and which transmits that character or character string to the communication terminal.

In such a way, it is possible to input characters by a common operational method even when the type of communication terminal is different.

The communication device of the present invention is provided with a presentation means which presents operational information of the operation keys and presents a character or character string transmitted from the smart card.

In this way, the operational efficiency of the operation keys may be improved.

The communication device of the present invention is provided with a designating means which designates a desired character or character string when a plurality of a characters or character string are presented by the presentation means.

In this way, similar to inputting Chinese characters, the device can be adapted to designate a desired character or character string from a plurality of character candidates as required.

The communication device of the present invention is adapted to consult frequency information showing the designation frequency of a character or character string and to prioritize the transmission of characters or character string with a high designation frequency when a plurality of characters or character strings exist corresponding to operational information.

In this way, operational characteristics can be improved when designating a desired character or character string.

The communication device of the present invention is adapted to consult frequency information showing the designation frequency of a character or character string and to prioritize the display of characters or character string with a high designation frequency when displaying a plurality of characters or character string.

In this way, operational characteristics can be improved when designating a desired character or character string.

The communication device of the present invention is adapted to determine a transmission order of characters or character string by consulting information showing past designation results when a plurality of characters or character string exist corresponding to operational information.

In this way, operational characteristics can be improved when designating a desired character or character string.

The communication device of the present invention is adapted to determine a display order of characters or character string by consulting information showing past designation results when displaying a plurality of characters or character string.

In this way, operational characteristics can be improved when designating a desired character or character string.

The communication device of the present invention is provided with an updating means which updates designation information or frequency information depending on a designation result of the designation means.

In this way, operational characteristics can be further improved as prior use characteristics are applied when designating a desired character or character string.

The communication device of the present invention is provided with a forwarding means which mutually forwards designation information and frequency information stored in a memory of the communication terminal and designation information and frequency information stored in the memory of the smart card.

In this way, for example, when the used smart card is changed, it is possible to apply use characteristics of a user in the new smart card.

The communication device of the present invention is ;provided with an editing means which edits stored content in the memory of the communication terminal or the stored content in the memory of the smart card.

In this way, it is possible to maximize the application of designation information and frequency information.

The communication device of the present invention is adapted to form an editing means using an external computer which is capable of communicating data with a communication terminal.

In this way, it is possible to heighten the operational. characteristics of editing operations.

The communication device of the present invention is adapted to transmit operational information of the external computer which is capable of communicating data with a communication terminal.

In this way, it is possible to improve the operational characteristics of character input.

The communication device of the present invention is provided with a selection means which selects a processing device which designates a character or character string when a communication terminal has a function of designating a character or character string corresponding to operational information.

In this way, it is possible to input characters using a function of a communication terminal according to the desires of a user (for example, when continued use of a smart card is inconvenient).

The communication device of the present invention is provided with a specifying means in the communication terminal which specifies a character or character string which corresponds to operational information when a smart card which has the function of specifying a character or character string corresponding to operational information is not connected to a communication terminal.

In this way, it is possible to input characters even when a smart card having a specifying function is not at hand.

The communication device of the present invention is provided with an updating means in the communication terminal which updates a program which executes the function of specifying a character or character string corresponding to operational information.

In this way, it is possible to use another operational method without preparing another smart card when it is desired to use another operational method.

The communication device of the present invention is provided with an choice means which chooses a used program when a plurality of programs are stored in a smart card or a communication terminal.

In this way, it is possible for a user to select an easy operational method.

The communication device of the present invention is adapted to output externally operation key operational information and a character or character string transmitted from a smart card and.

In this way, even when the communication terminal does not have a display, it is possible to present operational information of the operation keys and the like.

PREFERRED EMBODIMENTS OF THE INVENTION

In order to describe the invention in greater detail, the preferred embodiments will be outlined below with reference to the accompanying figures.

Embodiment 1

Figure 2:
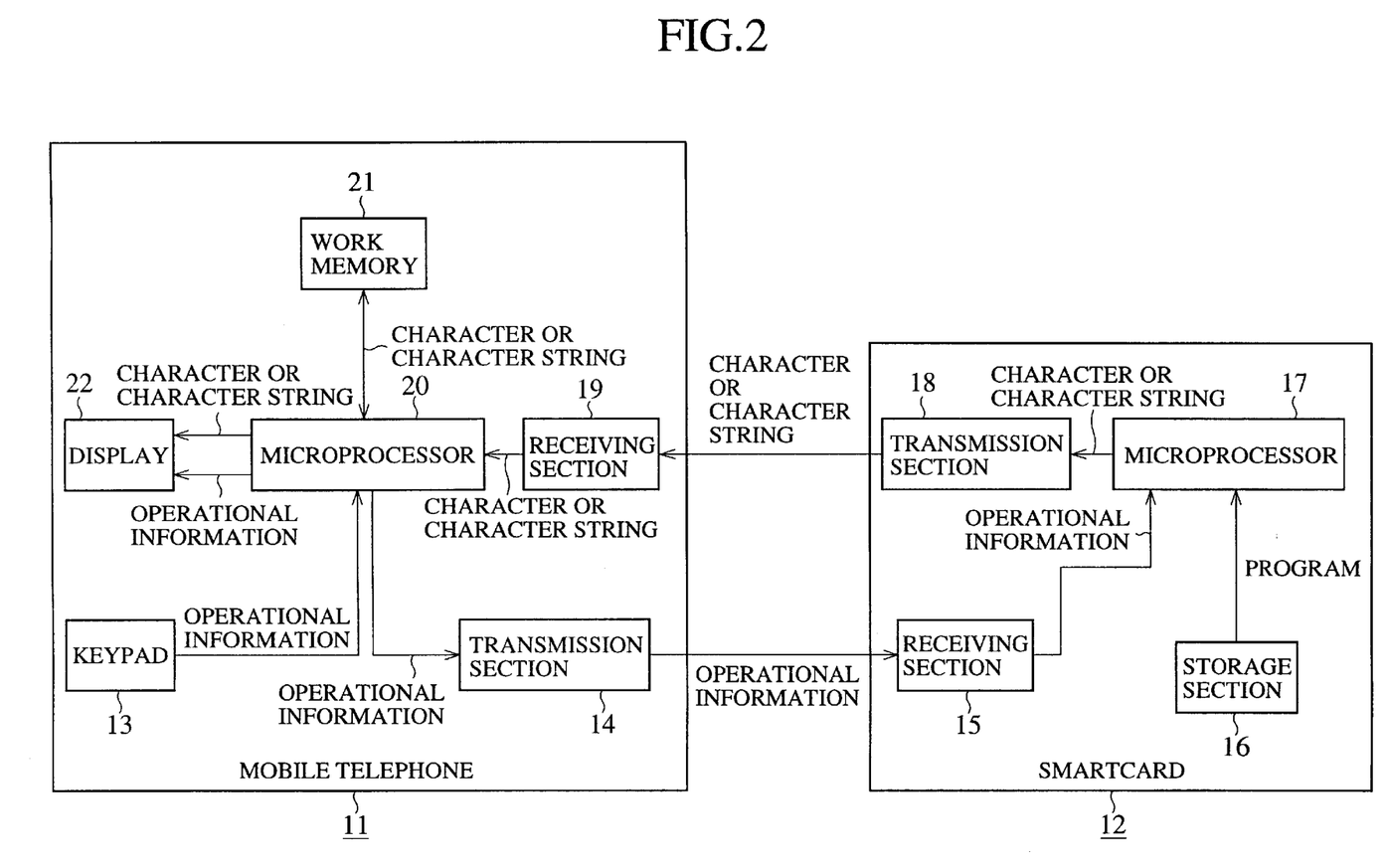
FIG. 2 shows a communication device according to a first embodiment of the present invention.

FIG. 2 shows a communication device according to a first embodiment of the present invention. In the figure, reference numeral 11 denotes a mobile telephone which is a communication terminal of a communication device, 12 is a smart card which is connected to a mobile telephone 11, 13 is a keypad (operation key) which inputs characters or telephone numbers, 14 is a transmission section (transmission means) which transmits operational information of the key pad 13 to the smart card 12, 15 receiving section which receives operational information from the key pad 13 transmitted from the transmission section 14 of the mobile telephone 11, 16 is a storage section which stores a program which executes the function of specifying a character or character string which corresponds to operational information, 17 is a microprocessor which specifies a character or character string which correspond to operational information according to a program stored in the storage section 16 when the receiving section 15 receives operational information of the key pad 13, and 18 is a transmission section which transmits a character or character string specified by the microprocessor 17 to the mobile telephone 11.

19 is a receiving section (receiving means) which receives a character or character string transmitted from the transmission section 18 of the smart card 12. 20 is a microprocessor which outputs operational information of the key pad 13 to the transmission section 14 and the display 22, which stores a character or character string in a work memory 21 when a character or character string is received and which outputs that character or character string to the display 22. 21 is a work memory which stores a character or character string or the like. 22 is a display (presentation means) which displays operational information of the key pad 13 and which displays a character or character string transmitted from the smart card 12.

Figure 3:
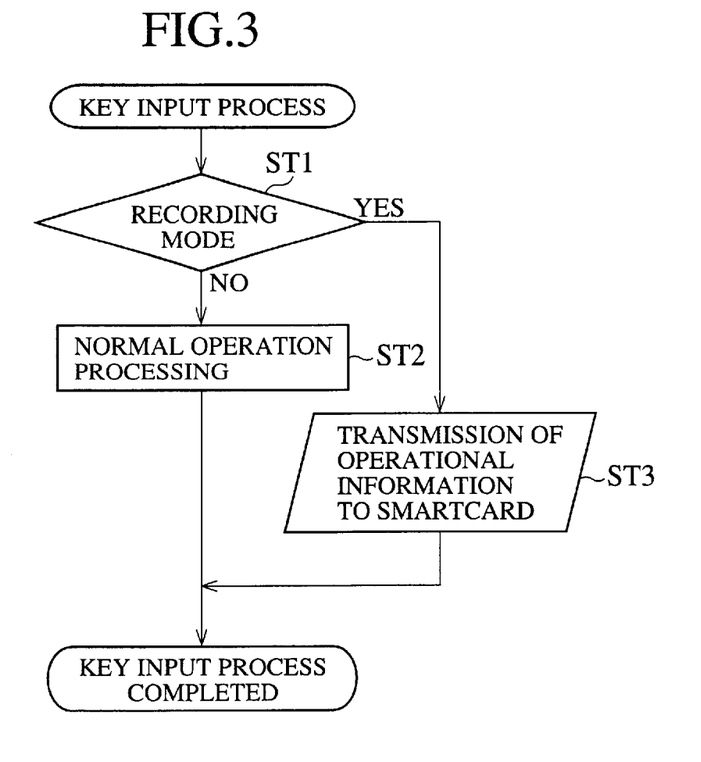
FIG. 3 is a flowchart showing processing contents of a microprocessor 20.
Figure 4:
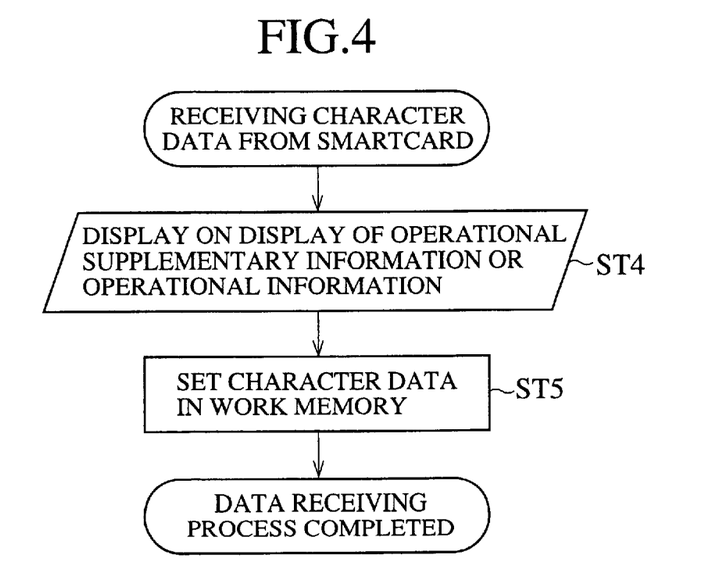
FIG. 4 is a flowchart showing processing contents of a microprocessor 20.

FIG. 3 and FIG. 4 are flowcharts showing processing contents of a microprocessor 20.

The operation of the invention will be described below.

A mobile telephone 11 generally has a recording mode for recording the telephone numbers of specified persons in addition to a normal working mode of receiving the input of telephone numbers.

The microprocessor 20 of the mobile telephone 11 generally operates on the currently set mode. For example if the normal working mode is presently set, operational information of the key pad 13 is interpreted as the telephone number of another person and that telephone number is displayed on the display 22. Thus a telephone call is made on the basis of that telephone number (step ST1, ST2).

On the other hand, when recording mode for recording the telephone number of a specified person is set, operational information of the key pad 13 is output to the transmission section 14 to execute specified processing by the smart card of characters corresponding to operational information of the key pad 13. Thus in order to improve user-friendly characteristics, operational information of the keypad 13 or supplementary information (for example, information displaying the operational method) are displayed on the display 22 (step ST4).

The transmission section 14 transmits operational information to the smart card 12 when operational information of the keypad 13 is output from the microprocessor 20 (step ST3).

The microprocessor 17 of the smart card 12 specifies a character or character string corresponding to operational information on the basis of a program stored in the storage device 16 on receipt by the receiver 15 of operational information of the key pad 13.

Such operational information contains a code specifying the pushed keypad 13 and information showing the frequency with which the keypad has been pushed. The processing contents which specify the character or character string from the code or push frequency are contained in the program.

The microprocessor 17 of the smart card 12 outputs a character or character string when a character or character string corresponding to operational information is specified and the transmitting section 18 transmits a character or character string to the mobile telephone 11.

The microprocessor 20 of the mobile telephone 11 stores a character or character string in the memory 21 in order to execute recording of a telephone number (the contents of the recording processing have been omitted) on receipt of the a character or character string by the receiver 19 (step ST5). The character or character string is displayed on the display 22.

As shown above, according to embodiment 1, when operational information of a key pad 13 is received from a transmitting section 19 of a mobile telephone 11, the microprocessor 17 of the smart card 12 is adapted to specify a character or character string corresponding to operational information from the key pad 13. Thus when the smart card 12 is connected to a mobile telephone 11, it is possible to input characters on the basis of a common operational method even when the type of mobile telephone 11 changes.

When Chinese characters are input, the scope of software becomes extremely large and the processing load on the microprocessor is large as a result of the extremely large number of characters handled. However in embodiment 1, since the microprocessor 17 of the smart card 12 performs processing, it is possible to suppress increases in the processing load of the microprocessor 20 of the mobile telephone 11.

Furthermore it is possible to reduce the memory capacity of the mobile telephone 11 as a program or the like which executes the function of specifying a character or character string corresponding to operational information need not be stored in the memory of the mobile telephone 11.

Embodiment 2

In embodiment 1, the display of a character or character string corresponding to operational information of the keypad 13 on the display 22 was described. However the situation may arise that a plurality of characters may correspond to operational information of the keypad 13.

For example when a character showing the reading the letter "a" from the operational information is specified, Chinese characters such as 亜,阿,娃 are displayed.

In this way, when a plurality of characters or character string (character candidates) are displayed, it is possible to select a desired character or character string by operating the keypad 13.

That is to say, when the key pad 13 (designation means) is operated, the microprocessor 20 (designation means) of the mobile telephone 11 executes processing to store the desired character or character string in the working memory 21 based on the operational contents.

In such a way, it is possible to adapt the device for use with the input of Chinese characters in which case a desired character must be designated from a plurality of character candidates.

Embodiment 3

Figure 5:
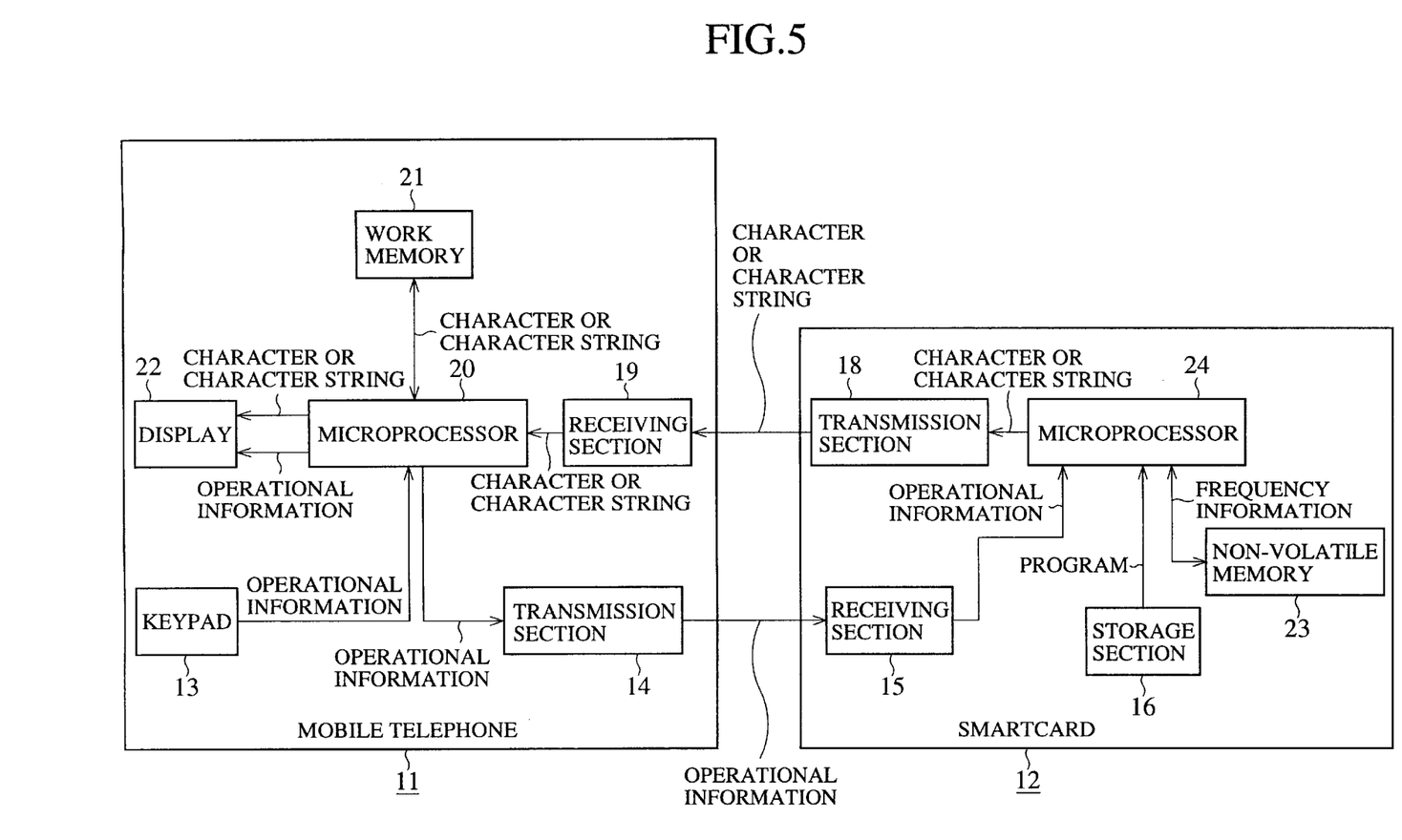
FIG. 5 shows a communication device according to embodiment 3 of the present invention.

FIG. 5 shows a communication device according to embodiment 3 of the present invention. Those components that are the same or similar to those of FIG. 2 are designated by the same reference numerals and will not be further described.

23 is a non-volatile memory (memory) which stores frequency information showing the designation frequency of characters or character string (character candidate). 24 is a microprocessor which, apart from having the same function as the microprocessor 17, consults frequency information stored in the non-volatile memory 23 and prioritizes the transmission of character candidates with high designation frequencies when a plurality of character candidates exist corresponding to operational information.

The operation of the invention will be described below.

In embodiment 2 when a plurality of character candidates exist corresponding to operational information from the keypad 13, a plurality of character candidates are displayed. However the microprocessor 20 of the mobile telephone 11 normally displays character candidates in the order of transmission transmitted from the smart card 12.

Thus if a character candidate with a high probability of being designated by a user is transmitted first, that character candidate will be displayed first. Thus the number of operations to designate a desired character is reduced and user-friendly characteristics are improved.

In embodiment 3, when a plurality of character candidates exists since the transmission of character candidates with high designation frequencies by a user is prioritized, transmission in the order of character candidates with a high frequency of being designated will be performed by consulting frequency information of character candidates considering the number of designation times or the designation period typical of a user in the past.

In this way, designation efficiency of character candidates transmitted in early time is increased and as a result, user-friendly characteristics are improved.

Embodiment 4

Figure 6:
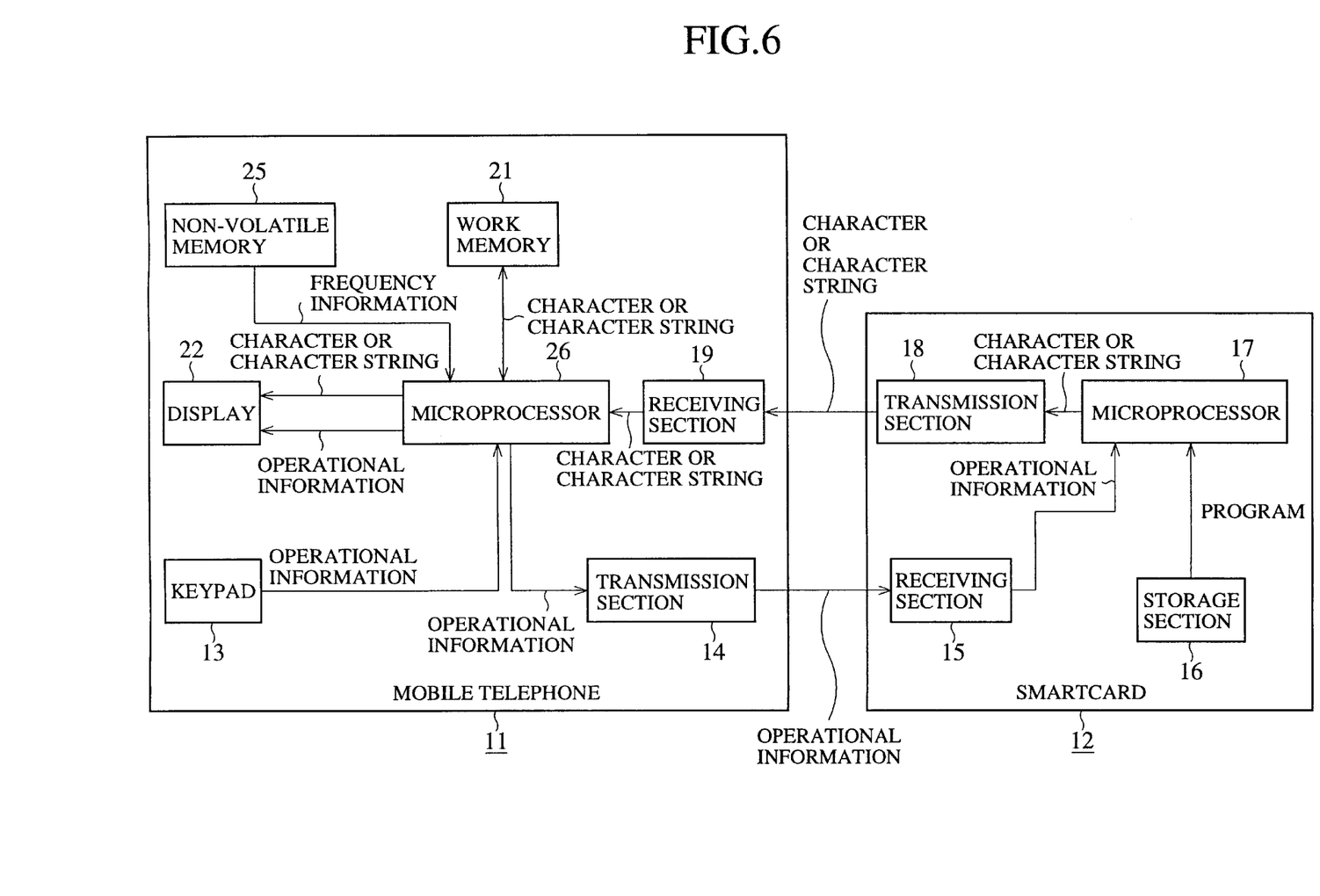
FIG. 6 shows a communication device according to embodiment 4 of the present invention.

FIG. 6 shows a communication device according to embodiment 4 of the present invention. Those components that are the same or similar to those of FIG. 2 are designated by the same reference numerals and will not be further described.

25 is a non-volatile memory (memory) which stores frequency information showing the designation frequency of characters or character string (character candidate). 26 is a microprocessor which, apart from having the same function as the microprocessor 20, consults frequency information stored in the non-volatile memory 25 and prioritizes the transmission of character candidates with high designation frequencies when a plurality of character candidates exists corresponding to operational information.

The operation of the invention will be described below.

In embodiment 3, when a plurality of character candidates exists corresponding to operational information of the keypad 13, the transmission of character candidates with high designation frequencies is performed. However when transmission of character candidates is performed without considering the frequency designation from a smart card 12, The microprocessor 26 of the mobile telephone 11 consults frequency information of character candidates and displays character candidates in order of high designation frequency in order to prioritize display of character candidates in order of high frequency of being designated by a user.

In this way, designation efficiency of character candidates transmitted in early time is increased and as a result, user-friendly characteristics are improved.

Embodiment 5

In embodiments 3 and 4, when a plurality of character candidates exist corresponding to operational information, character candidates are transmitted and displayed by referring to frequency information. However each occasion a desired character or character string is designated from a plurality of character candidates, the microprocessor (updating means) 24, 26 may be adapted to update frequency information depending on the result of the designation.

In this way, user-friendly characteristics are further improved when a desired character or character string is designated since the prior use characteristics of a user are applied.

Embodiment 6

In embodiment 3, when a plurality of character candidates corresponding to operational information exists, the transmission of character candidates is performed by reference to frequency information. However the determination of the order of transmission of the characters or character string may be performed by reference to designation information showing the results of past designations.

For example, when a pronunciation "Mitsubishi tarou" is designated from operational information, the following character string are obtained as character candidates.

First Candidate"三菱太郎"

Second Candidate"密微志田老"

In this case, although both character string will be transmitted to the mobile telephone 11, as discussed above, if the character candidates with a high probability of being designated by a user are transmitted first, that character string will be displayed first and so the number of operations when designating a desired character string will be reduced and user-friendly characteristics are improved.

In embodiment 6,in order to prioritize the transmission of character candidates with a high probability of being designated by a user, when a plurality of character candidates exists, the microprocessor 24 refers to designation information which shows past designation results.

For example, taking "mitsubishi tarou" as an example of a character string, when designation information which shows the fact that"三菱太郎"

has been designated in the past is stored in the non-volatile 23,"三菱太郎"

will be transmitted first and then the character string"密微志田老"

will be transmitted.

In this way, designation efficiency of character candidates transmitted in early time is increased and as a result, user-friendly characteristics are improved.

Embodiment 7

In embodiment 6, when a plurality of character candidates exists which corresponds to operational information in a keypad 13, transmission is performed in the order of character candidates designated in the past. However transmission of a character candidates can be performed without consideration of past designation results from the smart card 12. Thus in order to prioritize the display of character candidates with, a high probability of being designated by a user, the microprocessor 26 refers to designation information stored in the non-volatile memory 25 and display is performed in order of the character string designated in the past.

In this way, designation efficiency of character candidates transmitted in early time is increased and as a result, user-friendly characteristics are improved.

Embodiment 8

Embodiments 6 and 7 above were described as transmitting and displaying character candidates with reference to designation information when a plurality of characters and character string exists which correspond to operational information. However each occasion a desired character or character string is designated from a plurality of character candidates, the microprocessor (updating means) 24, 26 may be adapted to update frequency information depending on the result of the designation.

In this way, user-friendly characteristics are further improved when designating a desired character or character string since the prior use characteristics of a user are applied.

Embodiment 9

Figure 7:
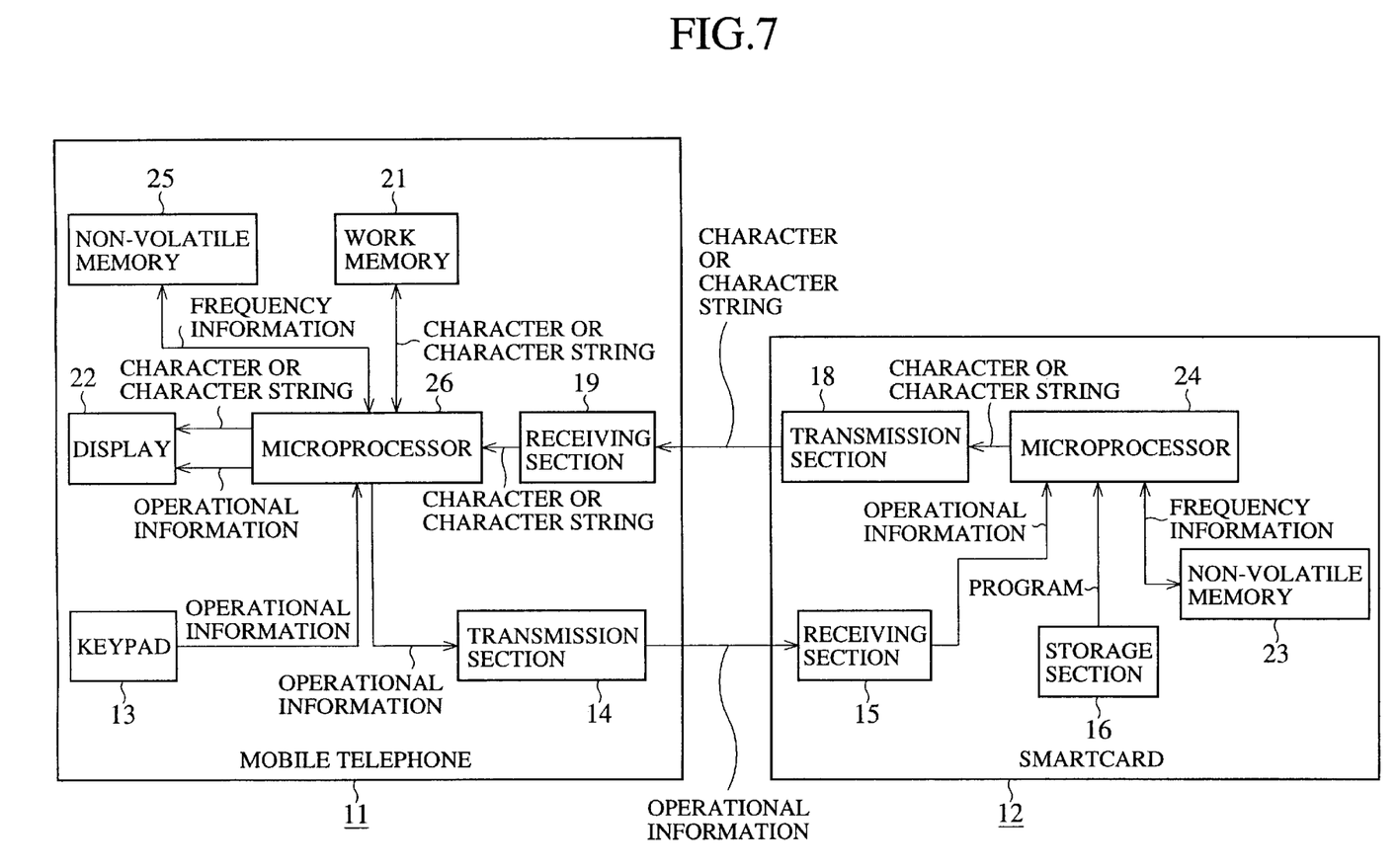
FIG. 7 shows a communication device according to embodiment 9 of the present invention.

In embodiments 3–8 above, a non-volatile memory is mounted in one of a mobile telephone 11 or a smart card 12 and frequency information or designation information is stored in the non-volatile memory. However as shown in FIG. 7, non-volatile memories 23, 25 may be mounted in both a mobile telephone 11 and a smart card 12.

Thus the microprocessor (forwarding means) 24 may be adapted to transmit frequency information or designation information stored in the non-volatile memory 23 of the smart card 12 to the non-volatile memory 25 the mobile telephone 11. Furthermore the microprocessor (forwarding means) 26 may be adapted to transmit frequency information or designation information stored in the non-volatile memory 25 of the mobile telephone 11 to the non-volatile memory 25 of the smart card 12.

In this way, when for example a used smart card 12 is replaced, it is possible to apply prior use characteristics of a user in the new smart card through the mobile telephone 11.

Embodiment 10

In embodiment 9, stored content in the non-volatile memories 23, 25 was mutually forwarded. However stored content in the nonvolatile memories 23, 25 may be edited by using an editing means such a microprocessor 24 and/or 26 and a key pad 13.

In this way, since redundant data may be eliminated as necessary, it is possible to maximize use of frequency and designation information and as a result to further improve user-friendly characteristics.

Embodiment 11

In embodiment 10, stored content in the non-volatile memories 23, 25 may be edited by using an editing means such a microprocessor 24 and/or 26 and a key pad 13. However stored content in the non-volatile memories 23, 25 may also be edited using a personal computer (external computer) which can communicate data to a mobile telephone 11.

Precisely, a serial terminal of a personal computer is connected with the serial terminal of a mobile telephone 11 to enable the personal computer to access the non-volatile memories 23, 25. In this way, editing operations of for example frequency information is facilitated and user-friendly characteristics with respect to editing are improved.

Embodiment 12

In embodiments 1–11, operational information of a keypad 13 was transmitted to a smart card 12. However operational information of a personal computer (external computer) which can communicate data to a mobile telephone 11 may be transmitted to a smart card 12.

Precisely, a serial terminal of a personal computer is connected with the serial terminal of a mobile telephone 11 and operational information of a personal computer (external computer) is transmitted to al smart card 12.

In this way, character input operations are extremely improved as various types of characters can be input in a simple manner.

Embodiment 13

In embodiments 1–12, characters and character string corresponding to operation information were specified by a smart card 12. However when a mobile telephone 11 has the function of specifying characters and character string corresponding to operational information, a switch (selection means) may be provided which selects a processing device (either mobile telephone 11 or smart card 12) which specifies a character or character string.

In this way, it is possible to input characters using the function of the mobile telephone 11 (for example when the connection of the smart card is inconvenient) as desired by a user.

Embodiment 14

In embodiment 13, a processing device was selected to specify a character or character string using a switch. However when a smart card which has the function of specifying a character or character string corresponding to operational information is not connected to a mobile telephone 11 (for example when power is switched ON or a smart card is inserted, the microprocessor 20 detects the presence or absence of its connection), the microprocessor 20 (specifying means) or the like may be adapted to specify a character or character string which corresponds to operational information.

In this way, even when a smart card 12 which has a specifying function is not at hand, it is possible to input characters.

Embodiment 15

In embodiments 1–14, a program which executes a function of specifying a character or the like which corresponds to operational information was stored in a storage section 16. However a variation means which varies the program may be provided.

Precisely, a serial terminal of a personal computer is connected to a serial terminal of the mobile telephone 11 to allow the personal computer to access the storage device 16.

In this way, it is possible to use another operation method without preparing another smart card even when it is desired to use another operation method.

Embodiment 16

In embodiments 1–14, a program was stored in a storage section 16. However when a plurality of programs are stored in the smart card 12 or the mobile telephone 11, a switch (choosing means) may be provided to select a program to be used.

In this way, it is possible for a user to easily select an operational method.

Embodiment 17

In embodiments 1–16 operational information from the keypad 13 or characters or character string transmitted from a smart card 12 were displayed on a display 22. However such information may be output as voice signals by using a speaker device.

such information may adapted to be output externally from a serial terminal of the mobile telephone 11.

In this way, when the mobile telephone 11 does not have a display 22, it is possible to display operational information on of the keypad 13.

INDUSTRIAL APPLICATION

As shown above, the communication device of the present invention is adapted to facilitate the processing of character input when recording a telephone number on a communication terminal such as a mobile telephone.

What is claimed is:

1. A communication device, comprising:
    a communication terminal for carrying on voice and/or data communication operations with other communication terminals over a communication channel, said communication terminal including.
    a keypad having a plurality of keys, each of said keys representing a plurality of different alphanumeric characters, wherein said keypad outputs operational information corresponding to a particular key when that particular key has been actuated by a user,
    a display for displaying alphanumeric characters, and
    a communication terminal microprocessor for receiving said operational information from said keypad, and outputting said operational information as output data when said communication terminal is set to a recording mode for storing information desired to be preset into said communication device; and
    a smart card, including
        a smart card microprocessor for receiving said operational information output data from the communication terminal microprocessor, processing said operational information in accordance with stored program instructions to obtain a character or character string, and outputting said character or character string to the communication terminal microprocessor;
    wherein said communication terminal microprocessor displays said character or character string received from the smart card microprocessor on said display.

2. A communication device according to claim 1 further provided with a presentation means which presents operational information from said operational key and which presents a character or a character string transmitted from said smart card.

3. A communication device according to claim 2 further provided with
    a designating means which designates a desired character or a character string when a plurality of characters or character string are presented by the presentation means.

4. A communication device according to claim 3 wherein said smart card consults frequency information which shows a frequency of designation of a character or character string and which prioritizes the transmission of said character or character string with a high designation frequency when a plurality of character or character string exists corresponding to operational information.

5. A communication device according to claim 4 wherein an updating means is provided which updates designation information or frequency information depending on a designation result of the designation means.

6. A communication device according to claim 4 wherein a forwarding means is provided which mutually forwards designation information and frequency information stored in the memory of the smart card and designation information and frequency information stored in the memory of the communication terminal.

7. A communication device according to claim 4 wherein an editing means is provided which edits stored contents of a memory of a communication terminal or stored contents of a memory of a smart card.

8. A communication device according to claim 7 wherein an editing means is formed by using an external computer which can communicate data with a communication terminal.

9. A communication device according to claim 4 wherein a variation means is provided which varies a program which executes a function of specifying a character or a character string which correspond to operational information.

10. A communication device according to claim 3 wherein said presentation means consults frequency information which shows a frequency of designation of said character or character string and which prioritizes the display of characters or character string with a high designation frequency when a plurality of character or character string is displayed.

11. A communication device according to claim 3 wherein said smart card consults designation information showing past designation results and determines a transmission order of characters and character string when a plurality of character or character string corresponding to operational information exists.

12. A communication device according to claim 3 wherein said presentation means consults designation information showing past designation results and determines a display order of characters and character string when a plurality of character or character string is displayed.

13. A communication device according to claim 2 wherein a presentation means is provided which outputs a character or a character string transmitted from said smart card and outputs operational information from said operation keys.

14. A communication device according to claim 1 wherein transmitting means transmits operational information of an external computer which can communicate data with a communication terminal.

15. A communication device according to claim 1 wherein a selection means is provided which selects a processing device which specifies a character or a character string when a communication terminal has a function of specifying a character or a character string which depend on operational information.

16. A communication device according to claim 1 wherein a specifying means is provided in said communication terminal, said specifying means specifying a character or a character string which correspond to operational information when a smart card which has the function of specifying a character or a character string which correspond to operational information is not connected to said communication device.

17. A communication device according to claim 1 wherein a replacing means is provided which replaces a program which executes a function of specifying a character or a character string which corresponds to operational information.

18. A communications device according to claim 1 wherein a choosing means is provided which selects a program which is to be used when a smart card or a plurality of programs are stored in said communication terminal.

* * * * *